United States Patent
Chen

(10) Patent No.: US 6,553,793 B1
(45) Date of Patent: Apr. 29, 2003

(54) MOTORCYCLE DISC BRAKE LOCK

(76) Inventor: Tian-Yuan Chen, P.O. Box 90, Tainan City (TW)

( * ) Notice: Subject to any disclaimer, the term of this patent is extended or adjusted under 35 U.S.C. 154(b) by 0 days.

(21) Appl. No.: 10/145,785

(22) Filed: May 16, 2002

(51) Int. Cl.[7] .............................................. E05B 67/36
(52) U.S. Cl. .............................. 70/33; 70/34; 70/233; 70/370 R
(58) Field of Search ......................... 70/33, 233, 386, 70/34, 379 R

(56) References Cited

U.S. PATENT DOCUMENTS

| | | | | |
|---|---|---|---|---|
| 4,403,485 A | * | 9/1983 | Scherbing | 70/379 R |
| 5,127,244 A | * | 7/1992 | Myers | 70/34 X |
| 5,265,453 A | * | 11/1993 | Konii et al. | 70/379 R |
| 5,577,409 A | * | 11/1996 | Oyabu et al. | 70/379 R |
| 5,713,224 A | * | 2/1998 | Liou | 70/34 |
| 5,819,889 A | * | 10/1998 | Shieh | 70/34 X |
| 5,916,279 A | * | 6/1999 | Shieh | 70/33 |
| 6,237,376 B1 | * | 5/2001 | Surratt | 70/34 |

* cited by examiner

*Primary Examiner*—Suzanne Dino Barrett

(57) ABSTRACT

A motorcycle disc brake lock includes a lock body, a rotary base, a deadbolt, a locking card, a coil spring, a lock column and a twist spring. In using, a key is applied to turn around the rotary member of the lock column to actuate the rotary base rotate. The engage members of the locking card are guided and actuated to move up and get into the engage recesses of the rotary base by the sloped surfaces of the two prop projections in the chamber of the lock body. Thus, the deadbolt is moved upward, forming an unlocked condition. For locking, only insert the disc brake of a motorcycle into the deep opening of the lock body to slightly push up the deadbolt and force the locking card to move into the slide slots of the rotary base. Thus, the deadbolt is pushed down to have its bottom end inserted in a lock hole to lock the disc brake.

1 Claim, 5 Drawing Sheets

MOTORCYCLE DISC BRAKE LOCK

BACKGROUND OF THE INVENTION

1. Field of the Invention

This invention relates to a motorcycle disc brake lock, particularly to one able to be unlocked by applying a key to turn around the rotary member of a lock spindle to move up a deadbolt, and to be locked only by inserting the brake saucer of a motorcycle into the cut groove of a lock body to slightly push up the deadbolt to let a locking card move up and disengage from the engage recesses to get into the slide groove of the rotary base by the recovering resilience of a twist spring. Then, the deadbolt together with the locking card is pushed downward by the recovering resilience of a coil spring on the deadbolt to force the bottom end of the locking bolt inserted into the lock groove under the cut groove of the lock body.

2. Description of the Prior Art

A conventional motorcycle disc brake lock, as shown in FIGS. 1 and 2, includes a lock body 10, a locking member 11, an actuating bolt 12, a cover 120, a lock base 13, a fitting member 14, two springs 102, 15 and a position pin 16 combined together.

The lock body 10 is formed with a vertical opening 100, having a U-shape, and a vertical receiving hole 101 provided in a right portion. The receiving hole 101 is fitted inside with the spring 102 and the actuating bolt 12 having a recessed groove 121 under for receiving the spring 102 therein. The actuating bolt 12 is formed with a notch 122 on a lower portion, and a sloped surface 123 and a vertical surface 124 on top. The cover 120 is mounted on and seals up the receiving hole 101 of the lock body 10. The lock body 10 is further provided on the right sidewall with an axial hole 103 communicating with the receiving hole 101 and aligned to a recessed groove 104 on the left portion of the lock body 10. Besides, the lock body 10 is bored on top with an insert hole 106 communicating with the axial hole 103, and the axial hole 103 is fitted inside with the spring 15 and the locking member 11 having a slide groove 110 and an insert slot 111. The locking member 11 has a slide groove 110 to match with the insert hole 106 of the lock body 10, with a position pin 16 inserted through the insert hole 106 and extend in the slide groove 110 to restrict the locking member 11 to move back and forth within the length of the slide groove 110. Then, the actuating bolt 12 has its top end engaged in an insert slot 111 of the locking member 11, which has its rear end housed with a cap 14.

In addition, the lock body 10 has a lock base hole 105 bored laterally beneath the axial hole 103 and communicating with the receiving groove 101 for receiving the lock base 13. The lock base 13 is formed with a projection 130 at the front end to match with the notch 122 on the wall of the actuating bolt 12. Thus, a key is used to turn around the lock base to control the actuating bolt 12 to move up and down and make for unlock and lock the locking member 11.

However, the components of a conventional disc brake lock 1 not only have to be orderly installed in multi-direction, but also need to match with one another in assembly, resulting in much trouble and inconvenience in assembling, and increasing producing cost.

SUMMARY OF THE INVENTION

The objective of the invention is to offer a motorcycle disc brake lock able to be locked stably on the disc brake of a motorcycle, easy in assembling and economical in producing.

The feature of the invention is that a lock body is formed with a lock base in an upper portion, the lock base having a chamber provided on the inner wall with two prop projections respectively having a sloped surface and a horizontal surface, two notches respectively formed between the two prop projections, a through hole bored at the bottom of the chamber of the lock base and communicating with a deep opening in a lower portion of the lock body. Further a lock hole formed in the bottom of the deep opening and aligned to the through hole. A rotary base to be received in the chamber of the lock base is provided with a center hollow having a through hole, two slide slots provided oppositely on its annular wall, a projection with an insert hole formed at one side of one of the two slide slots, and two engage recesses and two position grooves respectively and oppositely formed on top. A deadbolt to be fitted in the center hollow of the rotary base is provided with a protruding-out stop member at an upper end and a recess in the center. A locking card to be fixed on the top end of the deadbolt has a through hole in the center and two protruding-out engage members located oppositely. A coil spring has its bottom end fitted in the recess of the deadbolt. A lock column to be received in the chamber of the lock base is provided in the central interior with a rotary member having two lugs positioned oppositely at the bottom and two stop edges fixed oppositely in the annular wall. A twist spring is fitted around the lock column.

BRIEF DESCRIPTION OF DRAWINGS

The invention will be better understood by referring to the accompanying drawings, wherein.

DETAILED DESCRIPTION OF THE PREFERRED EMBODIMENT

Figure 1:
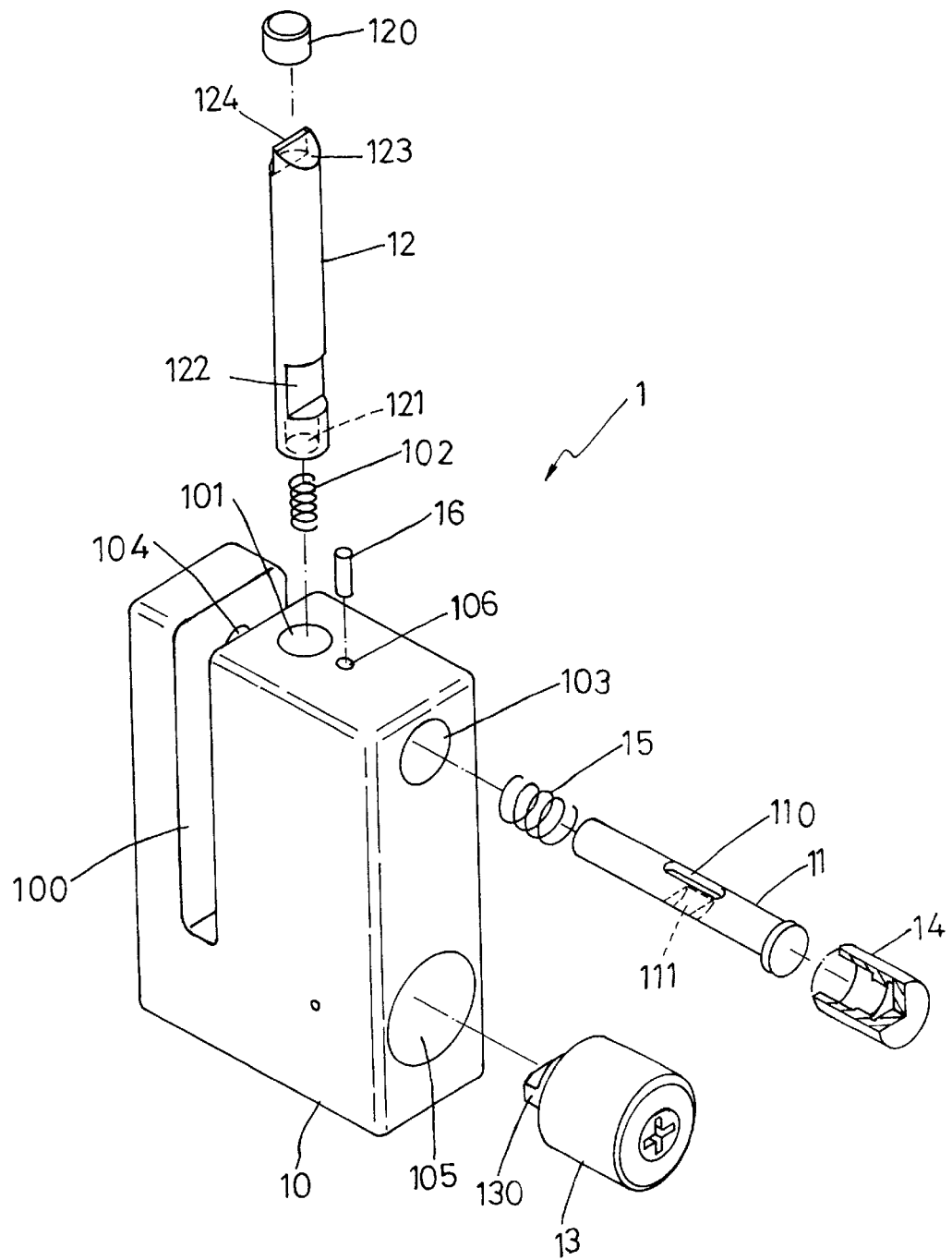
FIG. 1 is an exploded perspective view of a conventional motorcycle disc brake lock.
Figure 2:
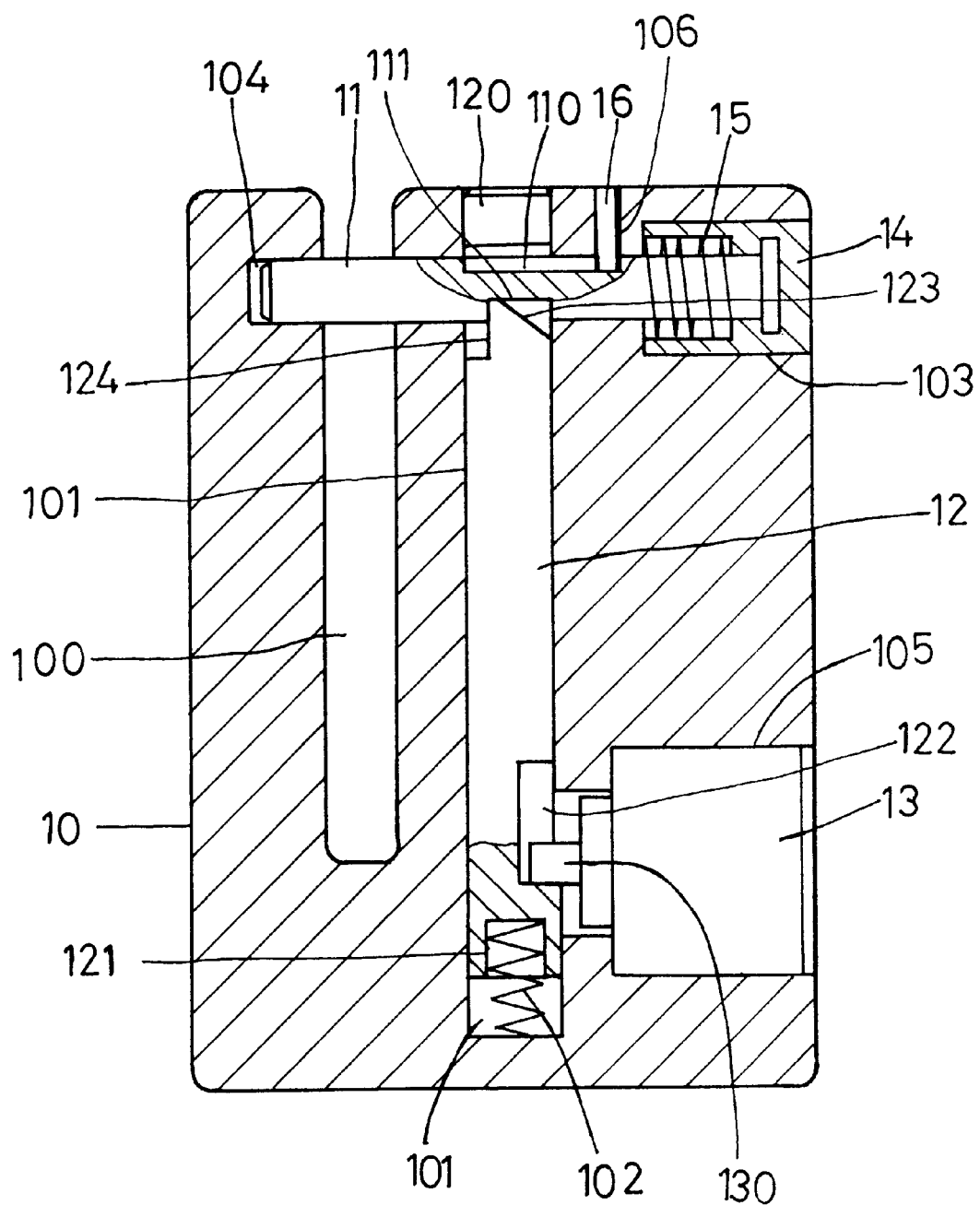
FIG. 2 is a cross-sectional view of the conventional motorcycle disc brake lock.
Figure 3:
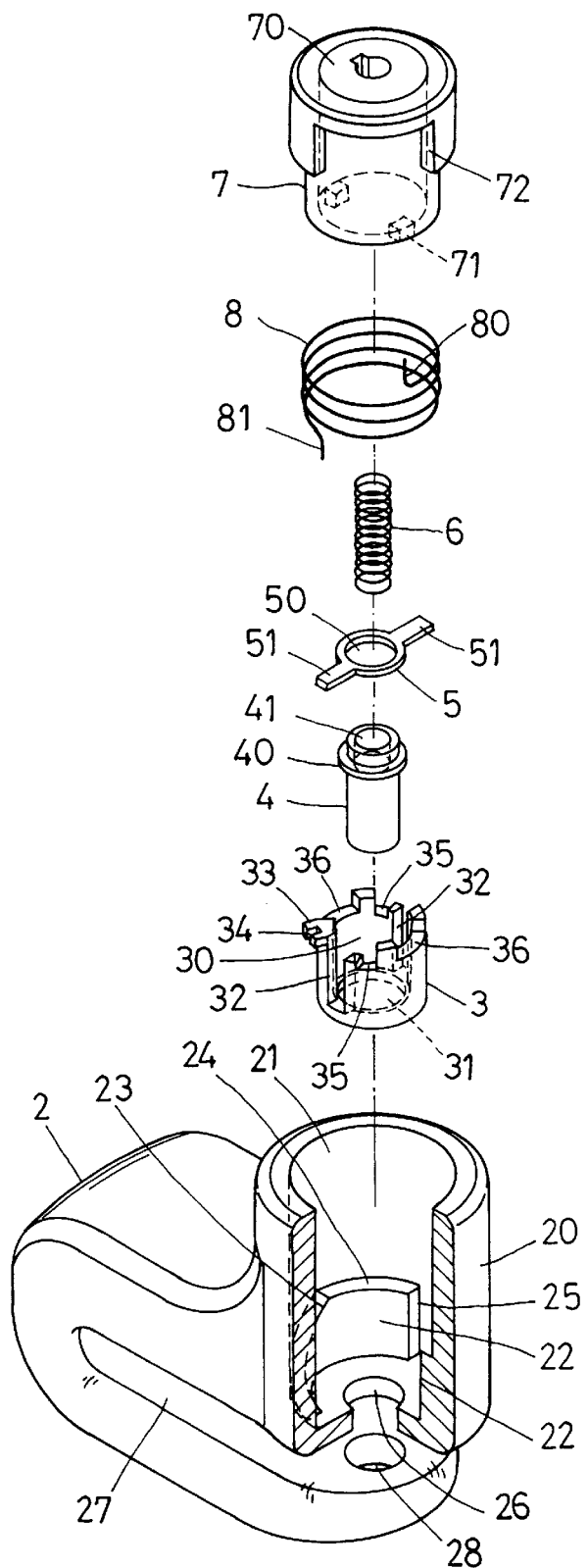
FIG. 3 is an exploded perspective view of a motorcycle disc brake lock in the present invention.

A motorcycle disc brake lock in the present invention, as shown in FIG. 3, includes a lock body 2, a rotary base 3, a deadbolt 4, a locking card 5, a coil spring 6, a lock column 7 and a twist spring 8 as main components combined together.

The lock body 2 is provided with a lock base 20 in a right upper portion, and the lock base 20 is formed with a chamber 21 in the interior. The chamber 21 has two prop projections 22 provided oppositely on the inner wall, and respectively formed with a sloped surface 23 and a horizontal surface 24, having two notches 25 respectively and oppositely formed between the two prop projections 22. A through hole 26 communicating with a deep opening 27 laterally formed in a lower portion of the lock body 2 is bored at the bottom of the chamber 21, and a lock hole 28 aligned to the through hole 26 is provided in the bottom of the deep opening 27.

The rotary base 3 to be received in the chamber 21 of the lock base 20 is formed with a center hollow 30 having a through hole 31 in the bottom, and has two vertical slide slots 32 provided oppositely in an annular wall, and a projection 33 with an insert hole 34 is formed at one side of one of the two slide slots 32. Besides, the rotary base 3 is respectively provided with two engage recesses 35 and two position grooves 36, with the two engage recesses 35 facing each other and the two position grooves 36 located oppositely.

The deadbolt 4 to be inserted in the center hollow 30 of the rotary base 3 has a protruding-out stop member 40 secured around an upper portion and a recess 41 on top.

The locking card 5 to be firmly fixed on the top end of the deadbolt 4 is provided with a through hole 50 in the center and two engage members 51 positioned oppositely to protrude outward.

The coil spring 6 has its bottom end engaged in the recess 41 of the deadbolt 4.

The lock column 7 to be installed in the chamber 21 of the lock base 20 is provided in the center with a rotary member 70 having two lugs 71 fixed oppositely at the bottom. The lock column 7 is further provided with two vertical stop edges 72 defining an opening in the outer annular wall.

The twist spring 8 is fitted around the lock column 7.

Figure 4:
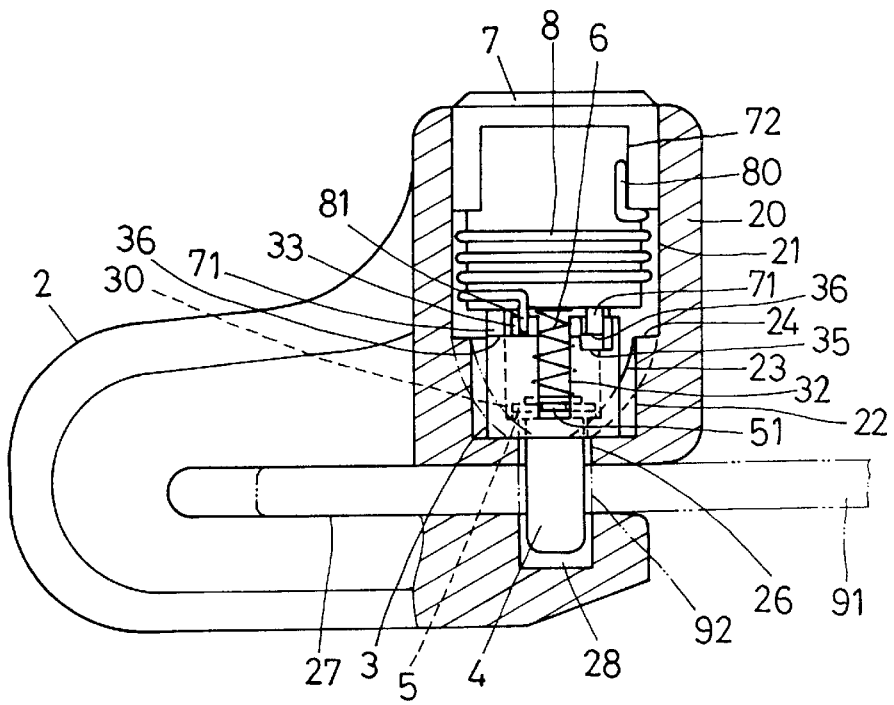
FIG. 4 is a cross-sectional view of the motorcycle disc brake lock in a locked condition in the present invention.

In assembling, as shown in FIGS. 3 and 4, firstly, the locking card 5 is fixed firmly on the top end of the deadbolt 4, and then the deadbolt 4 together with the locking card 5 is deposited in the center hollow 30 of the rotary base 3 to let the two engage members 51 of the locking card 5 respectively engaged in the two slide grooves 32 of the rotary base 3, and the bottom end of the deadbolt 4 extends out of the through hole 31 of the rotary base 3.

Next, the coil spring 6 received in the recess 41 of the deadbolt 4, the locking card 5, the deadbolt 4 and the rotary base 3 are all together deposited in the chamber 21 of the lock base 20 of the lock body 2, letting the bottom end of the locking bolt 4 extend out of the through hole 26 of the chamber 21 and get into the lock hole 28 in the bottom of the deep opening 27 of the lock body 2. Then the two engage members 51 of the locking card 5 are respectively positioned in the two notches 25 between the two prop projections 22 in the chamber 21.

Lastly, the twist spring 8 is fitted around the lock column 7 and has its upper end 80 resting on the stop edge 72 of the outer wall of the lock spindle 7. Then, the lock column 7 together with the twist spring 8 is pushed in the chamber 21 of the lock base 20, with the lower end of the twist spring 8 inserted in the insert hole 34 of the projection 33 of the rotary base 3. Simultaneously, the two lugs 71 at the bottom of the lock column 7 are respectively engaged in the two position grooves 36 of the rotary base 3, and the lock spindle 7 is fixed firmly in the chamber 21 of the lock base 20 of the lock body 2, thus finishing assembling a motorcycle disc brake lock.

In using, as shown in FIGS. 4, 5, 6 and 7, insert a key 90 into the lock column 7 to turn around the rotary member 70, which, having its two lugs 71 respectively engaged in the two position grooves 36 of the rotary base 3, will actuate the rotary base 3 rotate together with the deadbolt 4 and the locking card 5, because the two engage members of the locking card 5 are respectively fitted in the two slide slots 32 of the rotary base 3.

Figure 5:
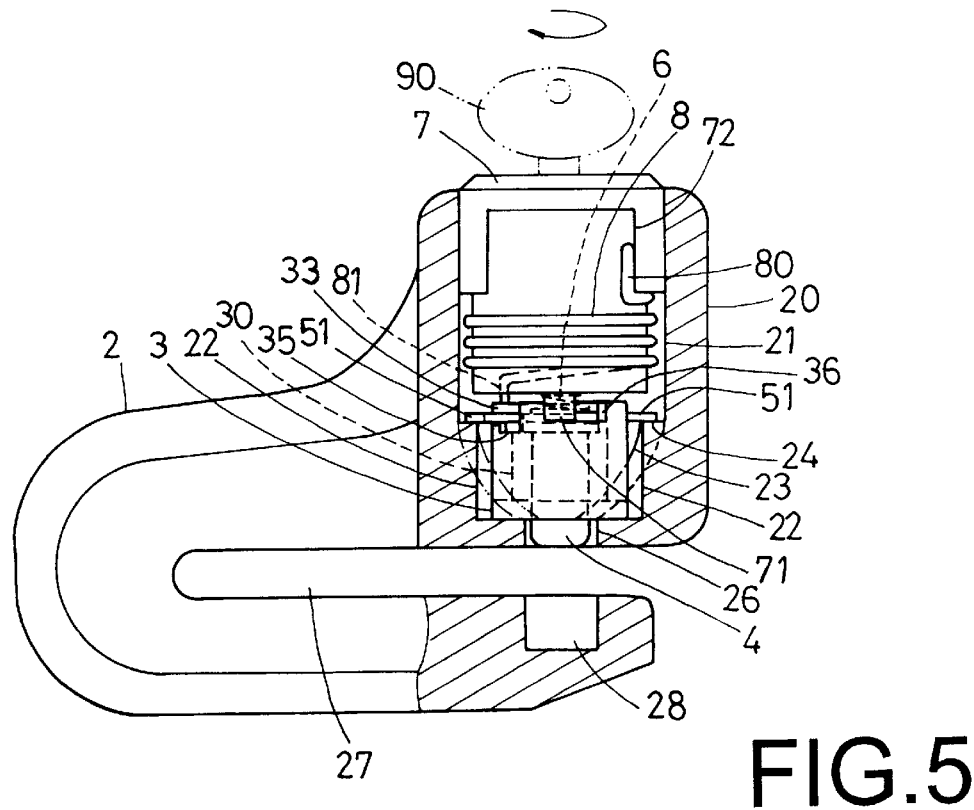
FIG. 5 is a cross-sectional view of the motorcycle disc brake lock unlocked by a key in the present invention.

At this time, the two engage members 51 of the locking card 5 positioned in the slide slots 32 of the rotary base 3 will rotate together with the rotary base 3 moving gradually upward along the sloped surface 23 of the prop projection 22 in the chamber 21 and subsequently moving the deadbolt 4 upward. Synchronously, the coil spring 6 is compressed to shrink by the moving-up deadbolt 4, and the twist spring 8 is twisted by the turning rotary base 3, which simultaneously pushes the locking card 5 to rest on the horizontal surfaces 24 of the prop projections in the chamber 21, letting the engage members 51 of the locking card 5 get away from the slide slots 32 and lie on the engage recesses 35 of the rotary base 3. At the same time, the bottom end of the deadbolt 4 is actuated to move upward and get away from the lock hole 28 and the deep opening 27 of the lock body 2, thus forming an unlocked condition of this lock, as shown in FIG. 5.

Figure 6:
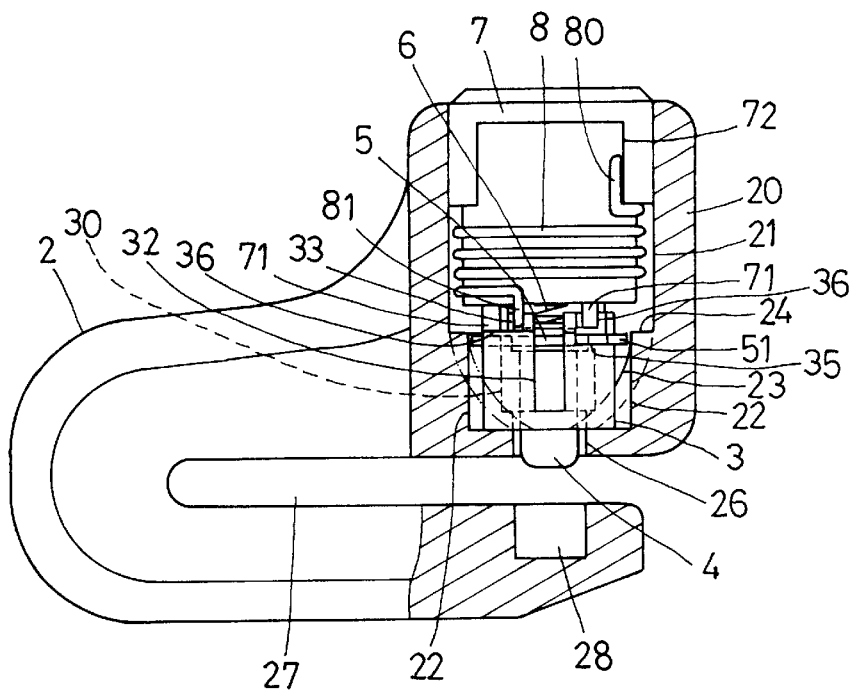
FIG. 6 is a cross-sectional view of the motorcycle disc brake lock unlocked by moving the engage members of a locking card into the engage recesses of a rotary base in the present invention; and, FIG. 7 is a cross-sectional view of the motorcycle disc brake lock to be locked with the brake saucer of a motorcycle in the present invention.

On the contrary, when the key 90 is no longer turned around, the twist spring 8 will recover its resilience to actuate the rotary base 3 rotate back, and at this time the two engage members 51 of the locking card 5 go back to rest on the sloped surfaces 23 of the prop projections 22, with the coil spring 6 recovering its resilience to push the deadbolt 4 downward to force the two engage members 51 of the locking card 5 to lie in the engage recesses 35 of the rotary base 3, as shown in FIG. 6.

Figure 7:
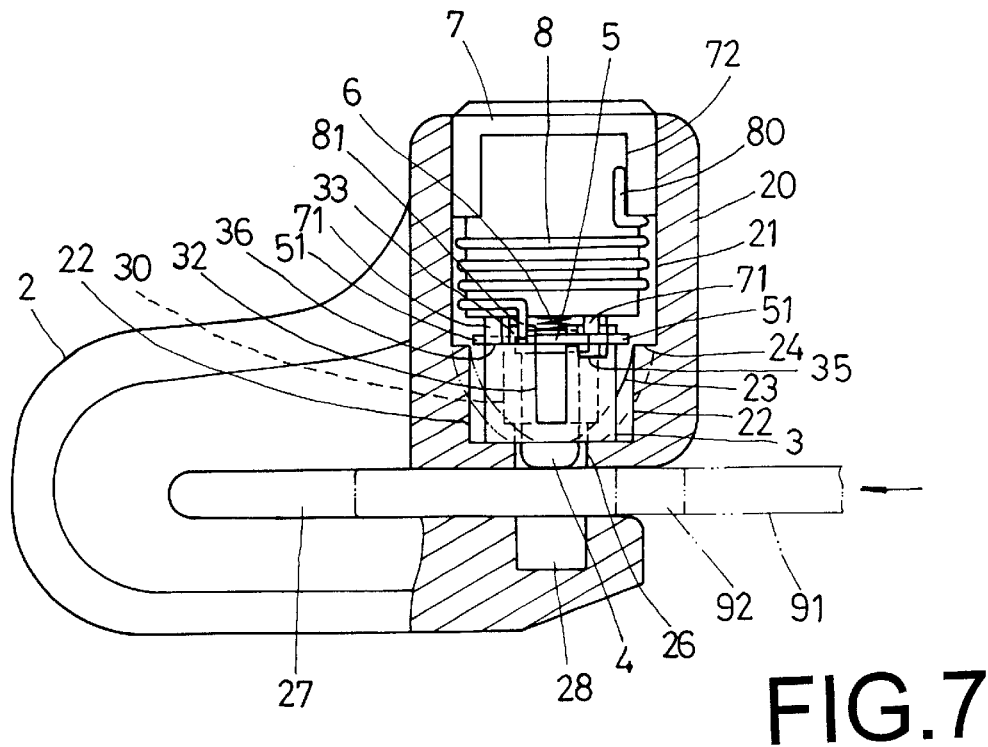

In case the disc brake lock is to be locked on the disc brake 91 of a motorcycle, simply insert the disc brake 91 into the deep opening 27 of the lock body 2 to push up the deadbolt 4, which has its bottom end a little protruding in the deep opening 27, as shown in FIG. 7. At this time, the two engage members 51 of the locking card 5 will be actuated to move upward and get away from the engage grooves 35 of the rotary base 3, and then get into the slide slots 32 of the rotary base 3 when the rotary base 3 is rotated back to its original position by recovering resilience of the twist spring 8. Meanwhile, the coil spring 6 recovers its resilience to push the locking card 5 together with the deadbolt 4 downward to force the bottom end of the deadbolt 4 inserted through the through hole 92 of the disc brake 91 and protrude into the lock hole 28 of the lock body 2, thus finishing locking the disc brake 91, as shown in FIG. 4.

While the preferred embodiment of the invention has been described above, it will be recognized and understood that various modifications may be made therein and the appended claims are intended to cover all such modifications that may fall within the spirit and scope of the invention.

What is claimed is:

1. A motorcycle disc brake lock comprising:

a lock body provided with a lock base in a right upper portion, said lock base formed with a chamber in the interior, said chamber having two prop projections located oppositely on an inner wall, each said prop projection respectively having a sloped surface and a horizontal surface, two notches respectively formed between said two prop projections, a through hole bored in a bottom of said chamber of said lock base and communicating with a deep opening in a lower portion of said lock boy, a lock hole provided in a bottom of said deep opening and aligned to said through hole;

a rotary base received in said chamber of said lock base formed with a center hollow in the interior, said center hollow having a through hole in a bottom, said rotary base having two slide slots bored oppositely in an annular wall, a projection with an insert hole formed at one side of one of said two slide slots, said rotary base further having two engage recesses and two position grooves respectively formed oppositely in an upper portion;

a deadbolt inserted in said center hollow of said rotary base and provided with a stop member protruding out around an upper end and a recess on top;

a locking card firmly fixed on the upper end of said deadbolt and provided with a through hole in a center of said locking-card and having two engage members located oppositely to protrude outward;

a coil spring having a bottom end fitted in said recessed groove of said deadbolt;

a lock column fixed in said chamber of said lock base and having a rotary member in a center thereof, said rotary member having two lugs fixed oppositely in a bottom thereof, said lock column having two stop edges formed to define an opening in an annular wall of said lock column;

a twist spring fitted around said lock column; and, a key inserted into said lock column to turn around said rotary member, said rotary member actuating said rotary base to rotate and forcing said twist spring twisted elastically, said two engage members of said locking card guided and actuated to move upward by said sloped surfaces of said prop projections in said chamber, said engage members moving up and getting into said engage recesses of said rotary base, said deadbolt forced to move up and compress said coil spring to shrink to form an unlocked condition, a disc brake of a motorcycle inserted into said deep opening of said lock body, said disc brake slightly moving said deadbolt upward, said locking card actuated to move up and get away from said engage recesses of said rotary base, said engage members of said locking card getting into said slide slots of said rotary base again by recovering resilience of said twist spring, said twist spring recovering said resilience to push down said deadbolt together with said locking card and forcing the bottom end of said deadbolt inserted into said lock hole under said deep opening of said lock body to finish locking said disc brake lock.

* * * * *